(12) United States Patent
Ahn et al.

(10) Patent No.: US 10,289,372 B2
(45) Date of Patent: May 14, 2019

(54) DISPLAY APPARATUS AND METHOD OF CONTROLLING THE SAME

(71) Applicant: Samsung Display Co., Ltd., Yongin-si, Gyeonggi-do (KR)

(72) Inventors: Sungsang Ahn, Yongin-si (KR); Taehyeog Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 289 days.

(21) Appl. No.: 15/277,808

(22) Filed: Sep. 27, 2016

(65) Prior Publication Data
US 2017/0139663 A1 May 18, 2017

(30) Foreign Application Priority Data
Nov. 18, 2015 (KR) .................. 10-2015-0161729

(51) Int. Cl.
| | |
|---|---|
| *G06F 1/16* | (2006.01) |
| *G06F 3/14* | (2006.01) |
| *G01B 7/30* | (2006.01) |
| *G06F 3/041* | (2006.01) |
| *G09G 3/20* | (2006.01) |
| *G06F 3/0354* | (2013.01) |
| *G06F 3/0362* | (2013.01) |

(52) U.S. Cl.
CPC ............. *G06F 3/1446* (2013.01); *G01B 7/30* (2013.01); *G06F 1/1618* (2013.01); *G06F 1/1681* (2013.01); *G06F 3/03547* (2013.01); *G06F 3/0416* (2013.01); *G09G 3/2092* (2013.01); *G06F 3/0362* (2013.01); *G09G 2330/026* (2013.01)

(58) Field of Classification Search
CPC ....... G01B 7/30; G06F 1/1618; G06F 3/0362; G06F 3/1446; G06F 1/1616; G06F 1/1652; G06F 1/1641; G06F 3/0416; G06F 3/03547; H04M 1/0216; G09G 3/2092; G09G 2330/026
See application file for complete search history.

(56) References Cited

U.S. PATENT DOCUMENTS

| | | | |
|---|---|---|---|
| 2013/0205142 A1 | 8/2013 | Jung | |
| 2014/0042293 A1* | 2/2014 | Mok | G06F 1/1652 248/682 |
| 2014/0111954 A1* | 4/2014 | Lee | G06F 1/1641 361/749 |

(Continued)

FOREIGN PATENT DOCUMENTS

| | | |
|---|---|---|
| KR | 10-2013-0091196 A | 8/2013 |
| KR | 10-2014-0096861 A | 8/2014 |

(Continued)

*Primary Examiner* — Richard J Hong
(74) *Attorney, Agent, or Firm* — Lewis Roca Rothgerber Christie LLP (57) ABSTRACT

A display apparatus and a method of controlling the display apparatus are provided. The display apparatus includes a connection unit, a case body that is rotatable with respect to the connection unit, a display panel on the case body, and including a functional layer, a joint unit having a plurality of links that connect the connection unit to the case body, a detector on a first one of the links, and an angle sensor unit mounted on a second one of the links.

19 Claims, 7 Drawing Sheets

(56) References Cited

U.S. PATENT DOCUMENTS

| | | | | |
|---|---|---|---|---|
| 2014/0126121 A1* | 5/2014 | Griffin | ................ | H04M 1/0216 |
| | | | | 361/679.01 |
| 2014/0210737 A1 | 7/2014 | Hwang et al. | | |
| 2014/0375219 A1 | 12/2014 | Lee et al. | | |
| 2015/0062025 A1 | 3/2015 | Lee et al. | | |
| 2015/0097755 A1 | 4/2015 | Kim | | |
| 2016/0132074 A1* | 5/2016 | Kim | ...................... | G06F 1/1652 |
| | | | | 715/769 |
| 2016/0179236 A1* | 6/2016 | Shin | ...................... | G06F 1/1616 |
| | | | | 345/173 |

FOREIGN PATENT DOCUMENTS

| | | |
|---|---|---|
| KR | 10-2014-0147253 A | 12/2014 |
| KR | 10-2015-0026537 A | 3/2015 |
| KR | 10-2015-0040553 A | 4/2015 |

* cited by examiner

DISPLAY APPARATUS AND METHOD OF CONTROLLING THE SAME

CROSS-REFERENCE TO RELATED APPLICATIONS

This application claims priority to, and the benefit of, Korean Patent Application No. 10-2015-0161729, filed on Nov. 18, 2015, in the Korean Intellectual Property Office, the disclosure of which is incorporated herein in its entirety by reference.

BACKGROUND

1. Field

One or more embodiments relate to a display apparatus and a method of controlling the display apparatus.

2. Description of the Related Art

Generally, examples of display devices include organic light-emitting displays, liquid crystal displays (LCDs), electrophoretic displays (EDs), surface-conduction electron-emitter displays (SEDs), vacuum fluorescent displays (VFDs), etc.

Display apparatuses may be used in mobile devices, such as smartphones, tablet personal computers, laptop computers, digital cameras, camcorders, and personal digital assistants (PDAs), or may be used in electronic products, such as slim-type televisions, displays, and advertisement panels.

Recently, research into manufacturing slimmer display apparatuses has been conducted. Among the display apparatuses, flexible display apparatuses, which are portable and applicable to devices of various shapes, have drawn attention as next-generation display apparatuses. In particular, flexible display apparatuses based on an organic light-emitting display technique are the most favorite display apparatuses.

Research into display apparatuses at least partially curved by using flexible display panels or bendable or foldable by a user are being conducted.

Information disclosed in this Background section may contain information that does not form the prior art.

SUMMARY

One or more embodiments include a display apparatus capable of measuring a folding angle of a display panel, and a method of controlling the display apparatus.

Additional aspects will be set forth in part in the description which follows and, in part, will be apparent from the description, or may be learned by practice of the presented embodiments.

According to one or more exemplary embodiments, a display apparatus includes a connection unit, a case body that is rotatable with respect to the connection unit, a display panel on the case body, and including a functional layer, a joint unit having a plurality of links that connect the connection unit to the case body, a detector on a first one of the links, and an angle sensor unit mounted on a second one of the links.

The first one of the links may be configured to linearly move with respect to the second one of the links when the case body rotates with respect to the connection unit.

The second one of the links may define a first guide hole into which the detector is inserted.

The angle sensor unit may include a plurality of sensors aligned along the first guide hole.

The angle sensor unit may be configured to sense a location of the detector when the case body rotates.

The functional layer may be configured to be activated in at least one area of the display panel when a location of the detector is measured by the angle sensor unit to be at a location.

The display panel may include a first display area on a first surface of the case body, and a second display area extending from the first display area, and located on a lateral surface of the case body and on a second surface of the case body.

The functional layer may be configured to be activated in the first display area when the first surface of the case body is flat.

The functional layer may be configured to be activated in the second display area when the first surface of the case body is folded such that folded portions of the first surface contact each other.

The functional layer may be configured to be activated in the first and second display areas when the first surface of the case body is folded at an angle.

The joint unit may include a first link on a lateral surface of the case body, and a second link including a first end rotatably coupled to the connection unit, and a second end defining a first guide hole, and being configured to move linearly in a lengthwise direction of the first link.

The detector may protrude from the first link, and at least a portion of the detector may be inserted into the first guide hole.

A first one of the detector and the angle sensor unit may define a concave groove, and a second one of the detector and the angle sensor unit may include a contact protrusion protruding toward the concave groove.

According to one or more exemplary embodiments, a display apparatus includes a case including a first case body, and a second case body rotatably connected to the first case body, and a display panel including a first display area on a first surface of the first case body, and on a first surface of the second case body, a second display area on a lateral surface of the second case body, and a on second surface of the second case body, and a functional layer that is configured to be activated in at least one area of the display panel according to an angle made by the first case body and the second case body.

The functional layer may be configured to be activated in the first display area when the angle made by the first case body and the second case body is a first angle, in the second display area when the angle made by the first case body and the second case body is a second angle, or in an entire area of the display panel when the angle made by the first case body and the second case body is between the first angle and the second angle.

The display apparatus may further include a joint unit including a plurality of links on a lateral surface of the first case body or a lateral surface of the second case body, a detector on a first one of the case and the joint unit, and an angle sensor unit on a second one of the case and the joint unit.

According to one or more exemplary embodiments, a method of controlling a display apparatus includes folding a display panel including a first display area on a first surface of a foldable case, and a second display area on a lateral surface of the case and on a second surface of the case, measuring an angle formed by the first surface of the display panel, and activating a functional layer of at least one area of the display panel based on the angle.

The measuring of the angle may include measuring the angle by a relative movement distance between a first link and a second link of a plurality of links on one side of the case.

A detector may be mounted on a first one of the first link and the second link, and an angle sensor unit is on a second one of the first link and the second link, and the measuring of the angle may include sensing a location of the detector using the angle sensor unit.

The activating of the functional layer may include activating the functional layer in the first display area when the angle formed by the first surface of the display panel is a first angle, activating the functional layer in the second display area when the angle formed by the first surface of the display panel is a second angle, or activating the functional layer in an entire area of the display panel when the angle formed by the first surface of the display panel is between the first angle and the second angle.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1A:
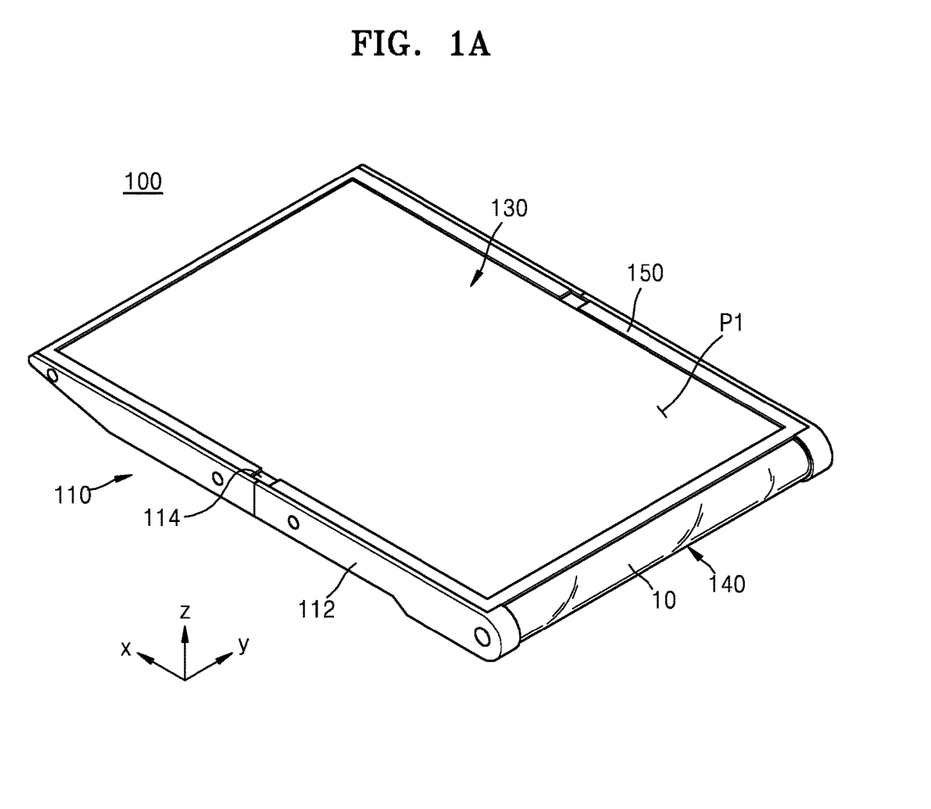
FIG. 1A is a perspective view of a display apparatus according to an embodiment of the present invention.
Figure 1B:
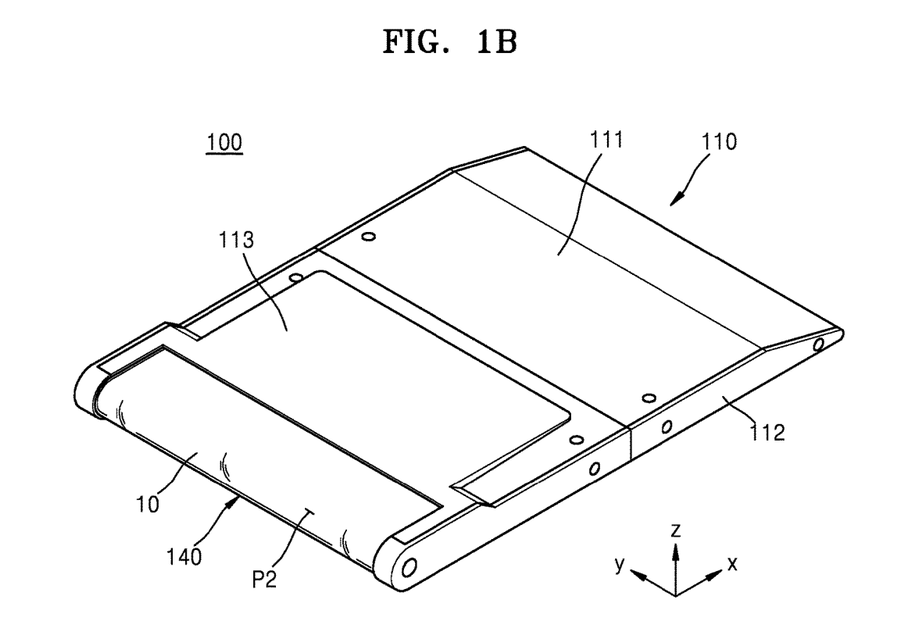
FIG. 1B is a back perspective view of the display apparatus of FIG. 1A.
Figure 2:
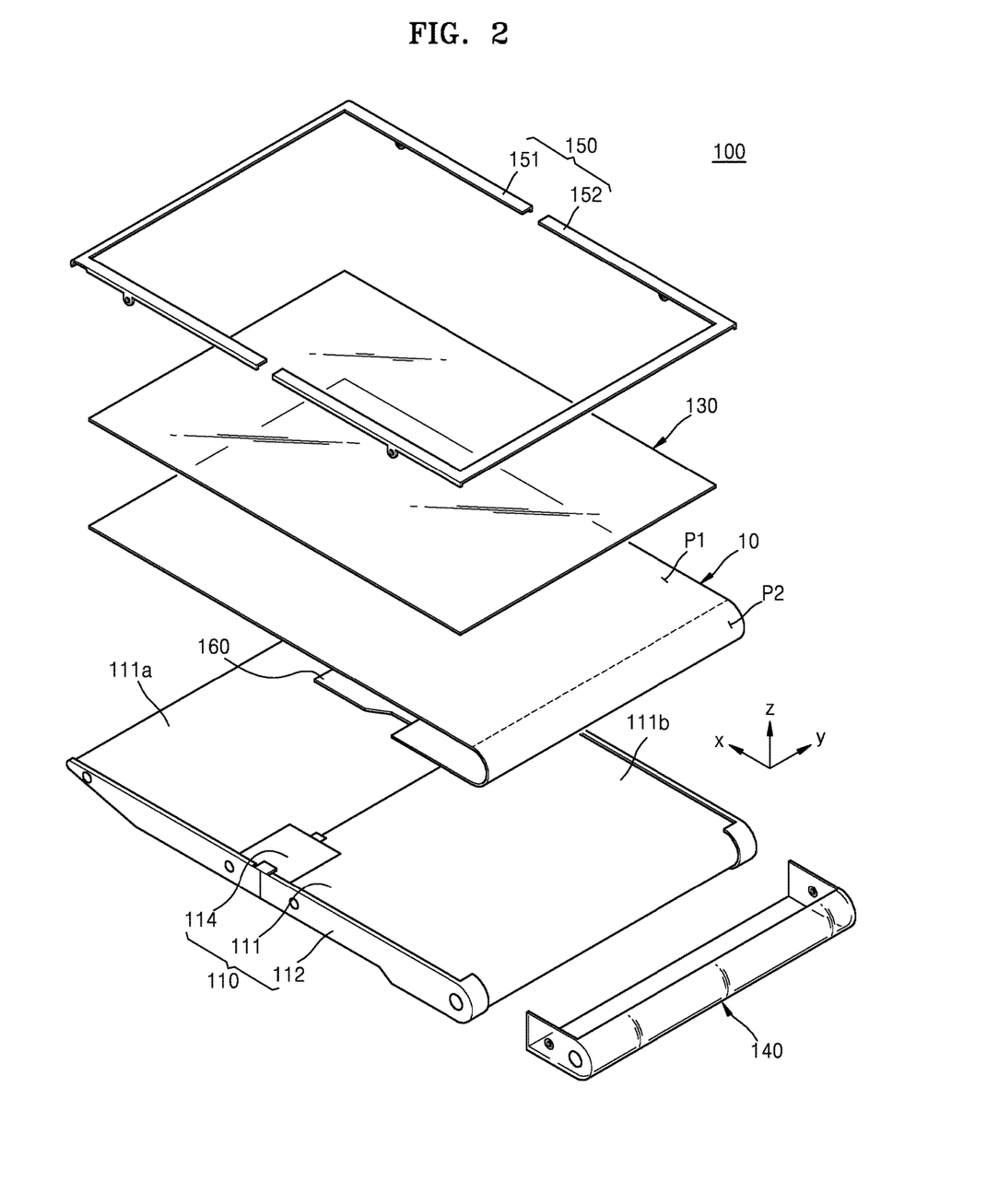
FIG. 2 is an exploded perspective view of the display apparatus of FIG. 1A.

FIG. 1A is a perspective view of a display apparatus 100 according to an embodiment of the present invention, FIG. 1B is a back perspective view of the display apparatus 100 of FIG. 1A, and FIG. 2 is an exploded perspective view of the display apparatus 100 of FIG. 1A.

Referring to FIGS. 1A, 1B, and 2, the display apparatus 100 may include a case (e.g., a foldable case) 110, a display panel 10, a window film 130, a cover window 140, a cover 150, and a circuit module 160.

The case 110 may include a case body 111, a first case cover 112, a second case cover 113, and a connection unit (e.g., connector) 114. The case body 111 may be formed to be divided into two parts, and the two parts may be connected to the connection unit 114, and may be able to be folded. The case body 111 may include a first case body 111a and a second case body 111b, and the first case body 111a and the second case body 111b may be rotatably connected to each other by the connection unit 114.

The case body 111 may be configured to only rotate in one direction. One surface of the first case body 111a and one surface of the second case body 111b may be formed to be leveled with the connection unit 114. The first case body 111a and the second case body 111b may be folded about, or with respect to, the connection unit 114. The first case body 111a and the second case body 111b may be folded at the connection unit 114 to contact each other. A portion of the display panel 10 may be seated on one surface of the case body 111.

Grooves or the like may be formed in, or defined by, an interior or exterior surface of the case body 111 so that a battery and the circuit module 160 may fit into the grooves or the like. In this case, the battery and the circuit module 160 may be shielded by the second case cover 113 or the like, such that the battery and the circuit module 160 may be shielded from exposure to the outside of the case body 111.

The first case cover 112 may be on a lateral surface of the case body 111 formed in a widthwise direction of the case body 111. The first case cover 112 may shield a portion of the cover window 140. A plurality of first case covers 112 may be respectively provided on lateral surfaces of the case body 111 and formed in the widthwise direction of the case body 111.

The second case cover 113 may combine with the case body 111, and thus may shield the battery or the circuit module 160 mounted on the case body 111. The second case cover 113 may be detachably mounted on a portion of the case body 111 that does not include the display panel 10 mounted thereon.

The connection unit 114 may be between divided portions of the case body 111 (e.g., first and second case bodies 111a and 111 b) to connect the divided portions to each other. The connection unit 114 may be configured to rotate each of the divided portions of the case body 111 in only one respective direction. In particular, the divided portions of the case body 111 may respectively rotate only in opposite directions about, or with respect to, the connection unit 114. Accordingly, the divided portions of the case body 111 may rotate about the connection unit 114 to be closer to each other, and may be folded. The divided portions of the case body 111 may rotate to form one plane about the connection unit 114.

The display panel 10 may be mounted on one surface of the case 110. The display panel 10 may be mounted in a lengthwise direction of the case 110. The display panel 10 may be mounted to surround a lateral surface of the case 110, and may be formed in the lengthwise direction of the case 110. The display panel 10 may be flexible.

The display panel 10 may be divided into a first display area P1 mounted on a first surface of the case body 111, and a second display area P2 mounted on a lateral surface of the case body 111 and on a second surface other than the first surface. A structure of the display panel 10 will now be described in detail.

The window film 130 may be mounted on the display panel 10 mounted in the lengthwise direction of the case 110. In particular, the window film 130 may be over, or above, an upper surface of the case 110 and may be mounted on the display panel 10. The window film 130 may be mounted over the first surface of the case body 111.

The window film 130 may be formed of a transparent material, and an exterior surface of the window film 130 may be hard-coated. The hard-coated portion of the window film 130 may be weak to a tensile force, but may be strong to a compression force.

The window film 130 may be formed of a high molecular material. For example, the window film 130 may include acryl-based resin and silicon-based resin. The window film 130 may be formed of polyimide, polycarbonate, polymethylmethacrylate, polyethersulfone, polyamide, polyamide-imide, or a combination thereof.

The window film 130 may be attached to the display panel 10 via an adhesion member and fixed thereto. The adhesion member may include optic transparent resin, although the adhesion member is not limited thereto, and the adhesion member may include any light-transmitting material that attaches the display panel 10 to the window film 130. According to another embodiment, the window film 130 and the display panel 10 may be fixed by the cover 150. The window film 130 and the display panel 10 may be fixed by the cover 150 and the case 110 without being attached or adhered to each other. According to another embodiment, the window film 130 and the display panel 10 may be fixed to each other by the adhesion member and the cover 150. However, for convenience of explanation, an embodiment where the window film 130 and the display panel 10 are fixed to each other by the adhesion member and the cover 150 will now be described in detail.

The cover window 140 may be mounted on the lateral surface of the case 111 formed in the lengthwise direction of the case 110. The cover window 140 may be mounted to completely surround the lateral surface of the case 110. The cover window 140 may completely shield the display panel 10 mounted on the lateral surface of the case 110. The cover window 140 may be mounted to surround the second display area P2 of the display panel 10.

The cover window 140 may be fixed to the case 110 by a special coupling member, such as a screw, a bolt, or an adhesion tape. At least a portion of the cover window 140 may be curved according to the surface of the display panel 10.

The cover window 140 may be formed of a transparent material. The transparent material may include at least one of transparent synthetic resin (e.g., acryl or polyethylene terephthalate (PET)), glass, and silicon. For convenience of description, an embodiment where the cover window 140 is formed of transparent synthetic resin will now be described in detail.

The cover 150 may be mounted on the window film 130 to prevent misalignment of the display panel 10, the window film 130, and the cover window 140. The cover 150 may include a first cover 151 and a second cover 152 that are separated from each other.

The first cover 151 may be on an upper surface of the window film 130 and fixed to the case 110. The first cover 151 may have a portion into which, or on which, the coupling member is inserted or mounted, and the portion may be inserted into the case 110 or attached to an exterior of the case 110.

The first cover 151 may be mounted to cover an edge of the window film 130. In this case, the first cover 151 may completely cover a portion of the edge of the window film 130, and may apply a force together with the case 110 to fix the window film 130 and the display panel 10.

The second cover 152 may be opposite to the first cover 151. Similar to the first cover 151, the second cover 152 may be mounted on the window film 130. The second cover 152 may be mounted to apply a force to a portion of the cover window 140. For example, a portion of the second cover 152 may be on a crossing region of the window film 130 and the cover window 140. In particular, the portion of the second cover 152 may completely cover a boundary line between an end of the window film 130 and an end of the cover window 140, and thus may cover the end of the window film 130 and the end of the first cover window 140.

The circuit module 160 may be connected to the display panel 10. The circuit module 160 may control the display panel 10. The circuit module 160 may be inserted into the case 110. In this case, the case body 111 may have a groove on which the circuit module 160 is to be seated, and the circuit module 160 may be shielded from the outside by the first case cover 112 mounted on the case body 111.

The display apparatus 100 may further include a main circuit module and a sound emission unit, such as a speaker that outputs sound. The display apparatus 100 may also include a button that receives an input signal from a user. Alternatively, the display apparatus 100 may include all components that are used in portable apparatuses capable of realizing images.

Regarding assembly of the above-described display apparatus 100, the display panel 10 may be seated on the case body 111. The case body 111 may be an assembly of the first case body 111a, the second case body 111b, and the connection unit 114.

The display panel 10 may be bent at the lateral surface of the case body 111, and thus a portion of the display panel 10 may be disposed on a rear surface of the case body 111. The first display area P1 of the display panel 10 may be seated on a first surface of the first case body 111a and a first surface of the second case body 111b. The second display area P2 of the display panel 10 may be seated on a lateral surface of the second case body 111b and a second surface of the second case body 111b. The display panel 10 may extend in one direction, and may be mounted on one lateral surface of the case body 111 and on a portion of the rear surface of the case body 111.

In particular, the display panel 10 may be seated on the case body 111. According to another embodiment, the display panel 10 may be seated on, and fixed to, the case body 111 by a special adhesion member or the like. The circuit module 160 may be connected to the portion of the display panel 10 on the rear surface of the case body 111, and the circuit module 160 may be inserted into the case body 111.

The cover window 140 may be on the bent portion of the display panel 10. The window film 130 may be attached to the display panel 10 and mounted together with the display panel 10. The adhesion member may be between the window film 130 and the display panel 10 to attach the window film 130 to the display panel 10.

After the cover window 140 is aligned, the first cover 151 and the second cover 152 may be placed on the window film 130 and assembled with the case body 111. The first case cover 112 and the second case cover 113 may be coupled to the case body 111. The first case cover 112 and the second case cover 113 may be coupled to the case body 111 according to various methods. For example, according to an embodiment, protrusions may be formed on the first case cover 112 and the second case cover 113, and grooves may be formed on, or defined by, the case body 111 to enable coupling with the protrusions. According to another embodiment, the first case cover 112 and the second case cover 113 may be coupled to the case body 111 via a special coupling member.

In this case, a portion of the first cover 151 and a portion of the second cover 152 may be between the first case cover 112 and the case body 111. The cover window 140 may be fixed to the case body 111, and may be placed between the first case cover 112 and the case body 111. Accordingly, the display panel 10 may be fixed to the case body 111.

Figure 3:
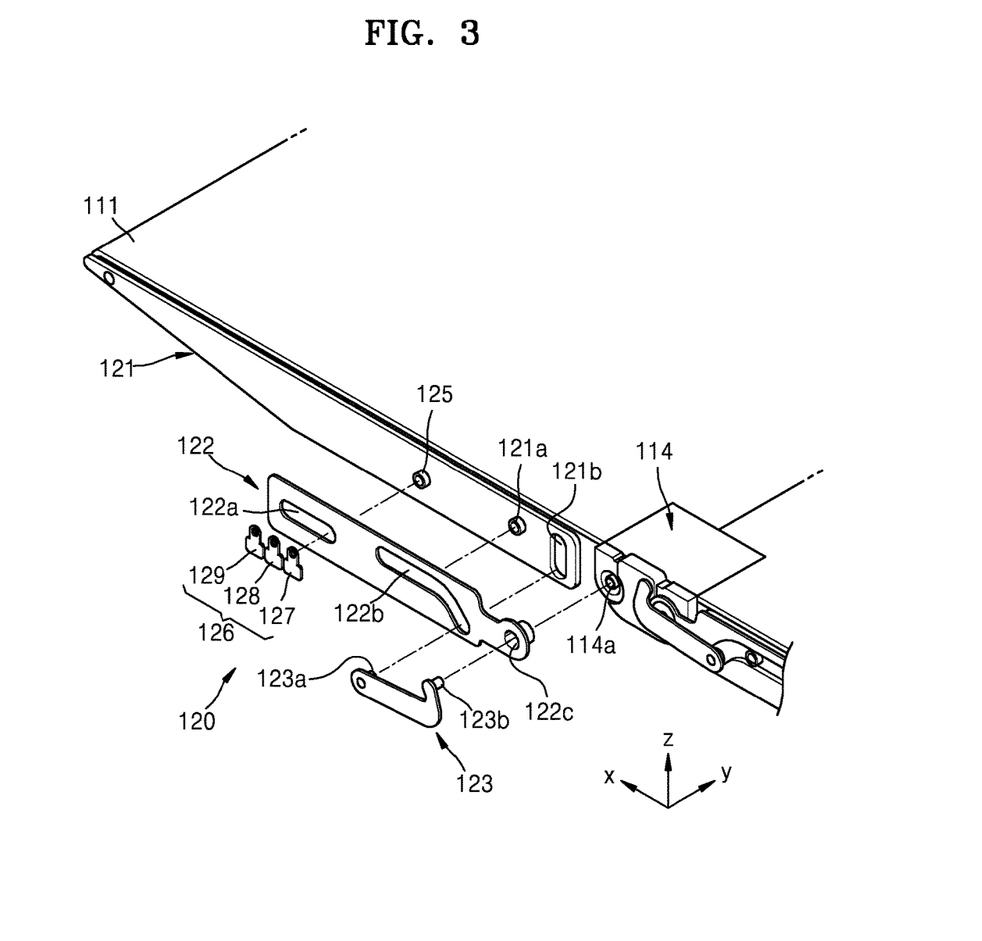
FIG. 3 is an exploded perspective view of a portion of the display apparatus of FIG. 1A.
Figure 4:
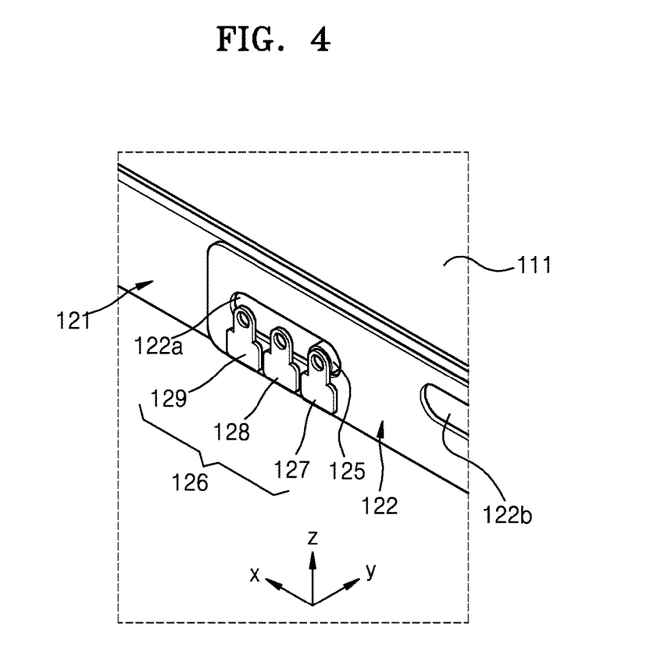
FIG. 4 is a magnified view of a joint unit of FIG. 3.

FIG. 3 is an exploded perspective view of a structure of a portion of the display apparatus 100 of FIG. 1A, and FIG. 4 is a magnified view of a joint unit (e.g., joint) 120 of FIG. 3.

Hereinafter, a folding angle of the display apparatus 100 is defined as an angle of the first surface of the case body 111, an angle between the first case body 111a and the second case body 111b, an angle of the first display area P1 of the display panel 10, or an angle of the first surface of the display panel 10.

Referring to FIGS. 3 and 4, a joint unit 120 may be mounted on the inner side of the first case cover 112 of the display apparatus 100.

The joint unit 120 may include a plurality of links that connect the case body 111 to the connection unit 114. The plurality of links may be provided on a lateral surface of the first case body 111a or the second case body 111b. The joint unit 120 may connect the connection unit 114 to the first case body 111a, or may connect the connection unit 114 to the second case body 111b. When the case body 111 rotates about the connection unit 114, one of the links of the joint unit 120 may linearly move with respect to another link.

In detail, the joint unit 120 may include a first link 121, a second link 122, and a third link 123.

The first link 121 may be provided on a sidewall of the first case body 111a or the second case body 111b. The first link 121 may be fixed to the first case body 111a and/or the second case body 111b. The first link 121 may include a first guide protrusion 121a protruding outwards, and may define a long hole 121b adjacent the connection unit 114.

The second link 122 is on one surface of the first link 121. The second link 122 may include, or define, a first guide hole 122a, a second guide hole 122b, and a rotation unit (e.g., a pivot point) 122c. The first guide hole 122a extends (e.g., extends a predetermined length) in a lengthwise direction of the first link 121. A detector 125 is on one side of the first guide hole 122a, and an angle sensor unit (e.g., an angle sensor) 126 is on the other side of the first guide hole 122a.

The second guide hole 122b is spaced from the first guide hole 122a. The second guide hole 122b has a straight section, and has a curved section that forms an angle (e.g., a predetermined angle) with the straight section. At least one second guide protrusion 123a of the third link 123 may be inserted into the second guide hole 122b.

The rotation unit 122c may be inserted into a rotation groove 114a of the connection unit 114, and thus the second link 122 may rotate with respect to the connection unit 114. When the case body 111 is folded with respect to the connection unit 114, one end of the second link 122 may be rotated with respect to the connection unit 114 by the rotation unit 122c. The other end of the second link 122 may be linearly moved along the first link 121 by the first guide protrusion 121a and the detector 125.

At least a portion of the third link 123 may be bent, and the third link 123 may include the second guide protrusion 123a and a rotation protrusion 123b. The second guide protrusion 123a may be inserted into the long hole 121b through the second guide hole 122b. The second guide protrusion 123a may move along the long hole 121b in a thickness direction of the case body 111. The second guide protrusion 123a may move through the curved section or through the straight section of the second guide hole 122b.

The detector 125 may protrude from the first link 121, and at least a portion of the detector 125 may be inserted into the first guide hole 122a. When the second link 122 moves relative to the first link 121, the detector 125 may move along the first guide hole 122a.

When the case body 111 pivots, the angle sensor unit 126 may sense a location of the detector 125. The angle sensor unit 126 may be provided on the second link 122, and may be aligned along the first guide hole 122a. A plurality of angle sensor units 126 may be included. The number of angle sensor units 126 may correspond to an angle(s) at which the case 110 is folded is to be measured.

For example, when an angle made by the first case body 111a and the second case body 111b is measured as 180° (e.g., when unfolded) and 0° (e.g., when folded), two angle sensor units 126 may be included. When the angle made by the first case body 111a and the second case body 111b is measured as 180° (e.g., when unfolded), 90° (e.g., when partially folded), and 0° (e.g., when folded), three angle sensor units 126 may be included. When the angle made by the first case body 111a and the second case body 111b is measured as 180° (e.g., when unfolded), 90°, 45°, and 0° (e.g., when folded), four angle sensor units 126 may be included. However, for convenience of description, a case where three angle sensor units 126 are included will now be described.

A method of measuring the folding angle of the display apparatus 100 is not particularly limited. For example, the detector 125 may contact one angle sensor unit 126, and may be electrically connected to the one angle sensor unit 126 to sense a preset angle. The detector 125 may measure a distance of a movement over the angle sensor unit 126, and may sense the angle based on the measured distance. The detector 125 or the angle sensor unit 126 may radiate laser or infrared light, and may sense an angle of the display apparatus 100 by using an irradiated location. However, for convenience of explanation, a case where the detector 125 and the angle sensor unit 126 contact each other, and are electrically connected to each other, and where a folding angle is measured according to the locations of the electrically connected sensors, will now be described.

The angle sensor unit 126 may include a first sensor 127 provided on one end of the first guide hole 122a, a second sensor 128 adjacent the first sensor 127, and a third sensor 129 on the other end of the first guide hole 122a.

When the second link 122 linearly moves with respect to the first link 121, the detector 125 moves with respect to the first guide hole 122a. The detector 125 may keep in contact with one of the first sensor 127, the second sensor 128, and the third sensor 129 according to a movement distance of the second link 122. Alternatively, the detector 125 might not contact the first sensor 127, the second sensor 128, and the third sensor 129.

A concave groove may be formed on, or defined by, a portion of the detector 125 that contacts the angle sensor unit 126. The angle sensor unit 126 may include a contact protrusion corresponding to the shape of the groove. In other words, the contact protrusion of the angle sensor unit 126 may be inserted into the groove of the detector 125, and thus contact between the detector 125 and the angle sensor unit 126 may be maintained. On the contrary, a contact protrusion may be formed on the detector 125, and a groove may be formed on, or defined by, the angle sensor unit 126, so that contact between the detector 125 and the angle sensor unit 126 may be maintained.

The detector 125 and the angle sensor unit 126 may be electrically connected to a controller. When the detector 125 contacts a preset angle sensor unit 126, the controller may sense an angle between the first case body 111a and the second case body 111b. When a location of the detector 125 measured by the angle sensor unit 126 corresponds to a preset location, the controller may activate a functional layer 12 (see FIG. 8) of at least one area of the display panel 10.

According to another embodiment, a plurality of angle sensor units may be mounted on a first link, and a detector may be mounted on a second link. When a first case body and a second case body rotate with respect to a connection unit, the detector may be moved by linear motion of the second link. At this time, the detector may contact one of the angle sensor units, and may sense a folding angle.

According to another embodiment, the second link may linearly move along a sidewall of the first case body or the second case body. In other words, when no first links are included and a case body is folded, the second link may linearly move along the sidewall of the first case body or the second case body. In this case, a detector may be mounted on the sidewall of the first case body or the second case body, and an angle sensor unit may be mounted on the second link. Alternatively, the angle sensor unit may be mounted on the sidewall of the first case body or the second case body, and the detector may be mounted on the second link.

According to another embodiment, one angle sensor unit may extend in a lengthwise direction of a first guide hole. When the case body is folded, the detector may move a distance, or a section of the angle sensor unit, by the linear motion of the second link. The folding angle of the case body may be measured by measuring a movement distance of the detector. A resistance value may be set differently in a lengthwise direction of the angle sensor unit, and thus the folding angle of the case body may be measured by measuring a resistance value according to a movement of the detector.

Figure 5:
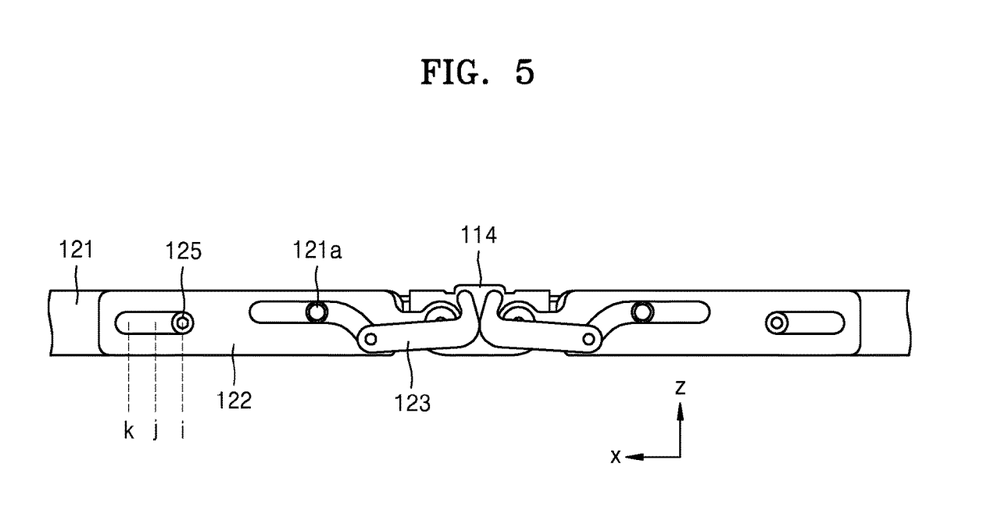
FIGS. 5, 6, and 7 show an operation of the joint unit according to an operation of the display apparatus of FIG. 3.
Figure 6:
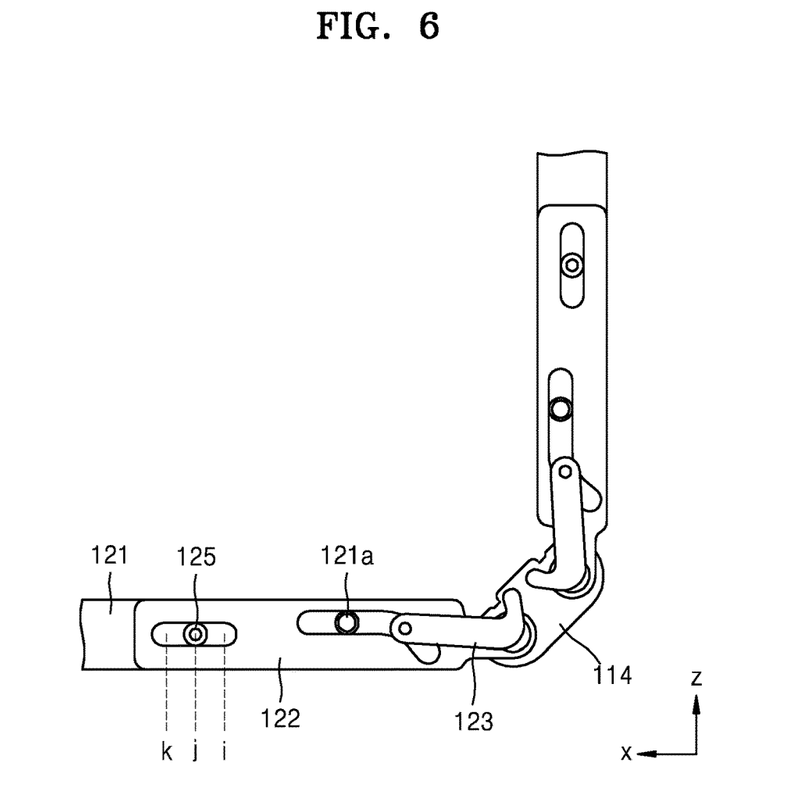
Figure 7:
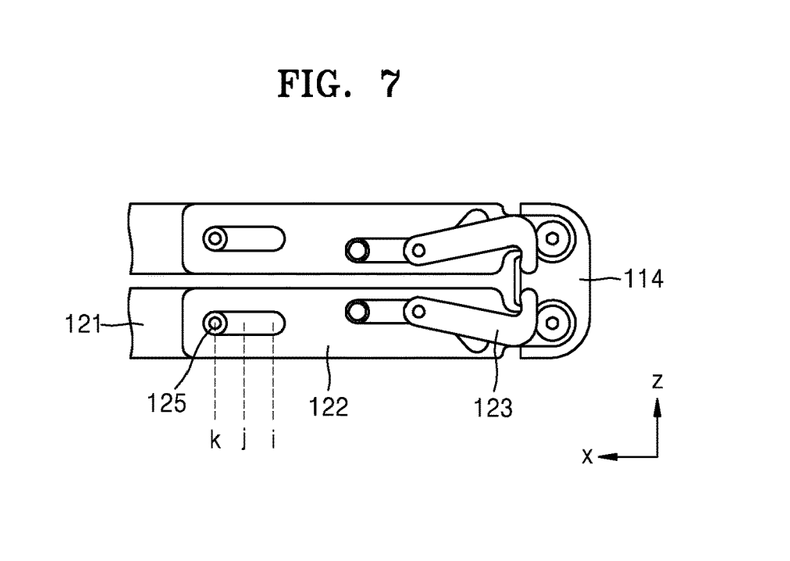

FIGS. 5, 6, and 7 show an operation of the joint unit 120 according to an operation of the display apparatus 100 of FIG. 3.

Hereinafter, the functional layer 12 of the display panel 10 being "activated" means the functional layer 12 being driven by an external input signal. The functional layer 12 being activated is defined as the functional layer 12 being driven when a user inputs an input signal, such as a touch input, to the display apparatus 100 (see FIG. 8).

Hereinafter, when the angle between the first case body 111a and the second case body 111b is 180°, the display apparatus 100 may be defined as having a first angle. When the angle between the first case body 111a and the second case body 111b is 0°, namely, when the first case body 111a and the second case body 111b are folded to contact each other, the display apparatus 100 may be defined as having a second angle. When the angle between the first case body 111a and the second case body 111b is less than the first angle and more than the second angle, the display apparatus 100 may be defined as having a third angle.

Referring to FIGS. 3 and 5, when the display apparatus 100 is unfolded, an angle of the first surface of the display panel 10 may be measured. When the angle between the first case body 111a and the second case body 111b is the first angle, the first display area P1 of the display panel 10 faces up.

In this case, the detector 125 is located at a first position (i) of the first guide hole 122a. Because the first sensor 127 of the angle sensor unit 126 is located at the first position (i), the detector 125 may be connected to the first sensor 127. When the detector 125 contacts the first sensor 127, the controller may determine that the angle between the first case body 111a and the second case body 111b is the first angle.

Referring to FIGS. 3 and 6, when the display apparatus 100 has the third angle (e.g., when the angle between the first case body 111a and the second case body 111b is 90°), the controller may measure, or determine, the angle of the first surface of the display panel 10. When the angle between the first case body 111a and the second case body 111b is the third angle, both the first and second display areas P1 and P2 of the display panel 10 face up.

In this case, the detector 125 is located at a second position (j) of the first guide hole 122a. Because the second sensor 128 of the angle sensor unit 126 is located at the second position (j), the detector 125 may be connected to the second sensor 128. When the detector 125 contacts the second sensor 128, the controller may determine that the angle between the first case body 111a and the second case body 111b is the third angle.

Referring to FIGS. 3 and 7, when the display apparatus 100 is folded, the controller may measure the angle of the first surface of the display panel 10. When the angle between the first case body 111a and the second case body 111b is the second angle, the second display area P2 of the display panel 10 faces up.

In this case, the detector 125 is located at a third position (k) of the first guide hole 122a. Because the second sensor 129 of the angle sensor unit 126 is located at the third position (k), the detector 125 may be connected to the third sensor 129. When the detector 125 contacts the third sensor 129, the controller may determine that the angle between the first case body 111a and the second case body 111b is the second angle.

Figure 8:
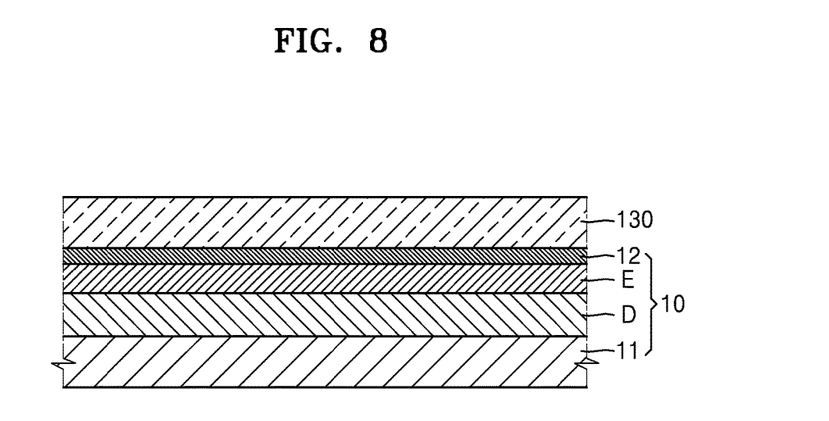
FIG. 8 is a schematic cross-sectional view of a display panel and a window film of FIG. 1.

FIG. 8 is a schematic cross-sectional view of the display panel 10 and the window film 130 of FIG. 1A.

The display panel 10 may include a substrate 11, a display D, an encapsulation unit E, and the functional layer 12. The substrate 11, the display D, and the encapsulation unit E will be described later. The window film 130 may be mounted on the upper surface of the first display area P1 of the display panel 10. The cover window 140 may be mounted on the upper surface of the second display area P2 of the display panel 10 (see FIG. 2).

The functional layer 12 may be a touch screen layer, and may include a touch sensor in which a first electrode and a second electrode alternate with each other. For example, the touch sensor may be an electrostatic capacitive touch sensor that determines a touch or a non-touch by detecting a change in electrostatic capacitance generated by a plurality of first electrodes and a plurality of second electrodes that alternate with each other. The functional layer 12 may be connected to the controller, and may be activated or non-activated according to the folding angle of the display panel 10. The functional layer 12 may be activated in at least one area of the display panel 10 according to an angle formed by the first surface of the display panel 10.

In detail, when the first surface of the case body 111 is flat, the functional layer 12 may be activated in the first display area P1. When the angle between the first case body 111a and the second case body 111b is the first angle, the functional layer 12 may be activated in the first display area P1. When the detector 125 contacts the first sensor 127, the controller may control the functional layer 12 of the first display area P1 of the display panel 10 to be activated.

When the first surface of the case body 111 has the third angle, the functional layer 12 may be activated in the entire area of the display panel 10. When the angle between the first case body 111a and the second case body 111b is the third angle, the functional layer 12 may be activated in the first display area P1 and the second display area P2. When the detector 125 contacts the second sensor 128, the controller may control the functional layer 12 of the first and second display areas P1 and P2 of the display panel 10 to be activated.

When the first surface of the case body 111 is folded, and when the two folded portions contact each other, the functional layer 12 may be activated in the second display area P2. When the angle between the first case body 111a and the second case body 111b is the second angle, the functional layer 12 may be activated in the second display area P2. In other words, when the detector 125 contacts the third sensor 129, the controller may control the functional layer 12 of the second display area P2 of the display panel 10 to be activated.

The intermediate layer 12 may further include a polarization layer or an optic film for external light reflection. The polarization layer may transmit only light vibrating in the same direction as a polarization axis from among light emitted from the display unit D, and may absorb or reflect light vibrating in directions that are other than the same direction as the polarization axis. The polarization layer may include a phase difference film that changes linearly-polarized light to circularly-polarized light, or that changes circularly-polarized light to linearly-polarized light, by applying a phase difference of λ/4 to two polarized components perpendicular to each other, and may include a polarization film that aligns a direction of light transmitted by the phase difference film, that divides the aligned light into two polarized components intersecting at 90°, that transmits only one component, and that absorbs or disperses the other component.

The display apparatus 100 may measure the folding angle of the first surface of the display panel 10 and may control activation of the functional layer 12.

A method of controlling the display apparatus 100 may include an operation of folding the display panel 10, an operation of measuring an angle formed by the first surface of the display panel 10, and an operation of activating the functional layer 12 based on the measured angle.

The operation of folding the display panel 10 is an operation of folding the display panel 10 having the first display area P1 and the second display area P2.

In the operation of measuring the angle formed by the first surface of the display panel 10, the angle may be measured by a relative movement distance between two of the plurality of links mounted on one side of the case 110. In detail, the detector 125 may be mounted on the first link 121, and the angle sensor unit 126 may be mounted on the second link 122, and thus the angle sensor unit 126 may sense a location of the detector 125. Alternatively, the detector 125 may be mounted on the second link 122, and the angle sensor unit 126 may be mounted on the first link 121, and thus the angle sensor unit 126 may sense a location of the detector 125.

In the operation of activating the functional layer 12 based on the measured angle, the functional layer 12 may be activated in the first display area P1 and/or the second display area P2 according to the measured angle. In detail, when the measured angle is the first angle, the functional layer 12 is activated in the first display area P1. When the measured angle is the second angle, the functional layer 12 is activated in the second display area P2. When the measured angle is the third angle, the functional layer 12 may be activated in both the first display area P1 and the second display area P2.

Figure 9:
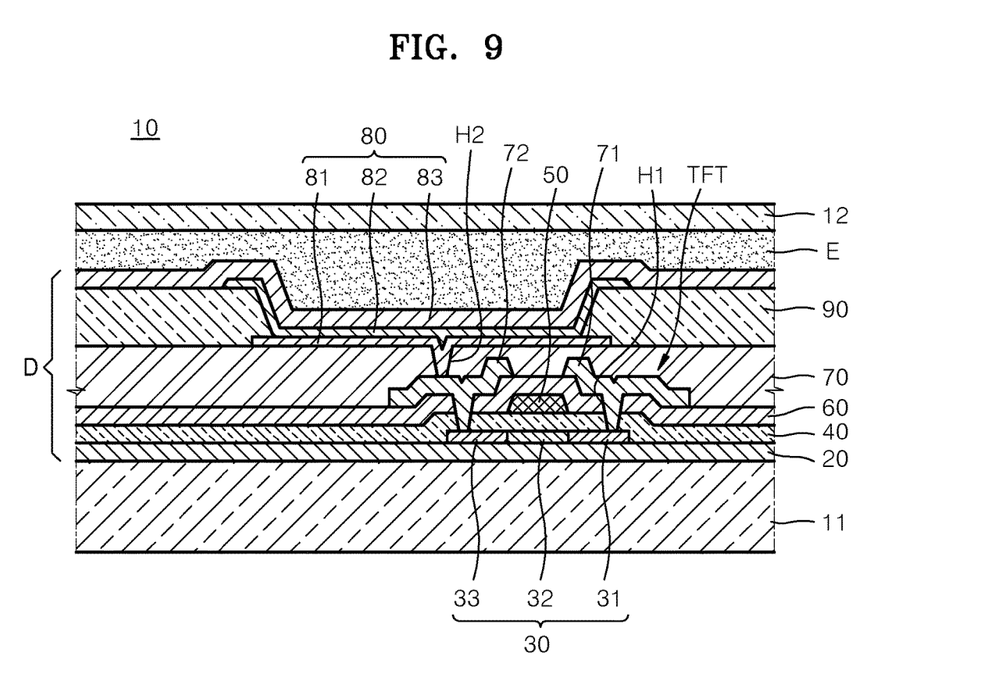
FIG. 9 is a cross-sectional view of one sub-pixel of the display panel of FIG. 1A.

FIG. 9 is a cross-sectional view of one sub-pixel of the display panel 10 of FIG. 1A.

Referring to FIG. 9, the organic light-emitting display panel 10 may include a substrate 11 and a light-emission unit D. The organic light-emitting display panel 10 may also include a thin-film encapsulation layer E formed on an upper surface of the light-emission unit D. The functional layer 12 may be formed on an upper surface of the thin-film encapsulation layer E.

The substrate 11 may be formed of a flexible insulative material. For example, the substrate 11 may be a polymer substrate such as polyimide (PI), polycarbonate (PC), polyethersulphone (PES), polyethylene terephthalate (PET), polyethylenenaphthalate (PEN), polyarylate (PAR), and/or fiber glass reinforced plastic (FRP).

According to an embodiment, the substrate 11 may be a glass substrate having a thickness that enables the substrate 11 to be bent. The substrate 11 may use a metal material. The substrate 11 may be transparent, opaque, or semi-transparent.

The light-emission unit D may be formed on the substrate 11. The light-emission unit D may include a thin film transistor TFT, a passivation layer 70 covering the thin film transistor TFT, and an organic light-emitting diode (OLED) 80 formed on the passivation layer 70.

A buffer layer 20 formed of an organic compound and/or an inorganic compound is further formed on an upper surface of the substrate 11. The buffer layer 20 may be formed of silicon oxide ($SiO_x$) (x≥1) and/or silicon nitride ($SiN_x$) (x≥1).

An active layer 30, which may be arranged in a predetermined pattern, is formed on the buffer layer 20, and is then buried, or covered, by a gate insulating layer 40. The active layer 30 includes a source region 31 and a drain region 33, and further includes a channel region 32 therebetween.

The active layer 30 may be formed to include various materials. For example, the active layer 30 may include an inorganic semiconductor material, such as amorphous silicon or crystalline silicon. As another example, the active layer 30 may include an oxide semiconductor. As another example, the active layer 30 may include an organic semiconductor material. However, for convenience of description, an embodiment where the active layer 30 is formed of amorphous silicon will now be described in detail.

The active layer 30 may be formed by forming an amorphous silicon layer on the buffer layer 20, crystallizing the amorphous silicon layer to form a polycrystalline silicon layer, and patterning the polycrystalline silicon layer. The source region 31 and the drain region 33 of the active layer 30 are doped with impurities according to a TFT type (e.g., whether the TFT is a driving TFT, a switching TFT, or the like).

A gate electrode 50 facing the active layer 30, and an interlayer insulating layer 60 which buries/covers the gate electrode 50, are formed at an upper surface of the gate insulating layer 40.

Contact holes H1 are formed in the interlayer insulating layer 60 and the gate insulating layer 40, and then a source electrode 71 and a drain electrode 72 are formed on the interlayer insulating layer 60 such that the source electrode 71 and the drain electrode 72 contact the source region 31 and the drain region 33, respectively.

The passivation layer 70 is formed on the thin film transistor TFT, and a pixel electrode 81 of the OLED 80 is formed on the passivation layer 70. The pixel electrode 81 contacts the drain electrode 72 of the thin-film transistor TFT through a via hole H2 formed in the passivation layer 70. The passivation layer 70 may be formed of an inorganic material and/or an organic material, and may be formed as a single layer or as multiple layers. The passivation layer 70 may be formed as a planarization layer, such that an upper surface of the passivation layer 70 is flat regardless of the unevenness of a lower layer that is under the passivation layer 70. Alternatively, the passivation layer 70 may be formed to be uneven according to the unevenness of the lower layer. The passivation layer 70 may be formed of a transparent insulator so that a resonance effect is achieved.

After forming the pixel electrode 81 on the passivation layer 70, a pixel-defining layer 90 is formed of an organic material and/or an inorganic material to cover the pixel electrode 81 (e.g., a ends of the pixel electrode 81) and the passivation layer 70. The pixel-defining layer 90 has, or defines, an aperture via which the pixel electrode 81 is exposed.

An intermediate layer 82 and an opposite electrode 83 are formed on at least the pixel electrode 81. The pixel electrode 81 functions as an anode, and the opposite electrode 83 functions as a cathode. Alternatively, the pixel electrode 81 may function as a cathode, and the opposite electrode 83 may function as an anode. The pixel electrode 81 and the opposite electrode 83 are insulated from each other by the intermediate layer 82, and respectively apply voltages of opposite polarities to the intermediate layer 82 to induce light emission in an organic emission layer.

The intermediate layer 82 may include an organic emission layer. For example, the intermediate layer 82 includes an organic emission layer. However, the intermediate layer 82 may further include at least one of a hole injection layer (HIL), a hole transport layer (HTL), an electron transport layer (ETL), and an electron injection layer (EIL). The present embodiment is not limited thereto, and the intermediate layer 82 may further include various other functional layers in addition to an organic emission layer.

One unit pixel includes a plurality of sub-pixels, and the plurality of sub-pixels may emit light of various colors. For example, the unit pixel may include a plurality of sub-pixels which respectively emit red light, green light, and blue light, or a plurality of sub-pixels which respectively emit red light, green light, blue light, and white light, for example.

The thin-film encapsulation layer E may include a plurality of inorganic layers, or may include an inorganic layer and an organic layer.

The organic layer of the thin-film encapsulation layer E is formed of a polymer and may be a single layer, or may be a layer stack formed of polyethylene terephthalate (PET), PI, polycarbonate (PC), epoxy, polyethylene, and/or polyacrylate. The organic layer may be formed of polyacrylate. In detail, the organic layer may be a product of polymerizing a monomer composition including a diacrylate-based monomer and a triacrylate-based monomer. The monomer composition may further include monoacrylate-based monomer. The monomer composition may further include a well-known photoinitiator such as trimethyl benzoyl diphenyl phosphine oxide (TPO), but the present invention is not limited thereto.

The inorganic layer of the thin-film encapsulation layer E may be a single layer, or may be a layer stack including metal oxide or metal nitride. In detail, the inorganic layer may include silicon oxide ($SiO_2$), silicon nitride ($SiN_x$), aluminum oxide ($Al_2O_3$), titanium oxide ($TiO_2$), zirconium oxide ($ZrO_x$), and/or zinc oxide ($ZnO$).

An uppermost layer exposed to the outside in the thin-film encapsulation layer E may be formed of an inorganic layer to prevent infiltration of moisture to the OLED 80.

The thin-film encapsulation layer E may include at least one sandwich structure in which at least one organic layer is interposed between at least two inorganic layers. Alternatively, the thin-film encapsulation layer E may include at least one sandwich structure in which at least one inorganic layer is interposed between at least two organic layers. Alternatively, the thin-film encapsulation layer E may include a sandwich structure in which at least one organic layer is interposed between at least two inorganic layers, and a sandwich structure in which at least one inorganic layer is interposed between at least two organic layers.

The thin-film encapsulation layer E may include a first inorganic layer, a first organic layer, and a second inorganic layer sequentially formed starting from an upper portion of the OLED 80. Alternatively, the thin-film encapsulation layer E may include a first inorganic layer, a first organic layer, a second inorganic layer, a second organic layer, and a third inorganic layer sequentially formed starting from the upper portion of the OLED 80. Alternatively, the thin-film encapsulation layer E may include a first inorganic layer, a first organic layer, a second inorganic layer, a second organic layer, a third inorganic layer, a third organic layer, and a fourth inorganic layer sequentially formed starting from the upper portion of the OLED 180.

A halogenated metal layer including lithium fluoride (LiF) may be further included between the OLED 80 and the first inorganic layer. The halogenated metal layer may prevent the OLED 80 from being damaged when the first inorganic layer is formed by sputtering.

The first organic layer may have a smaller area than the second inorganic layer, and the second organic layer may also have a smaller area than the third inorganic layer.

The display apparatus 100 exposes a portion of the display panel 10 to the outside, and thus enables a user to obtain various pieces of information without looking at the entire portion of the display panel 10. The display apparatus 100 is formed foldable, and is thus portable by a user, thereby increasing user convenience.

The display apparatus 100 is able to more easily and more accurately measure the folding angle of the display panel 10. The display apparatus 100 is able to accurately measure the folding angle of the display panel 10 by operations of links.

According to the display apparatus 100 and the method of controlling the display apparatus, a function of one or more areas of the display panel 10 may be activated according to the folding angle of the display panel 10. According to the display apparatus 100 and the method of controlling the display apparatus, only a function of an area capable of receiving an input may be activated according to the folding angle of the display panel 10, and thus functionality and user convenience of the display apparatus 100 may improve.

Display apparatuses according to embodiments of the present invention may easily and accurate measure the folding angle of a display panel. According to a display apparatus and a method of controlling the display apparatus, functionality and user convenience of the display apparatus may improve. Of course, the scope of the present invention is not restricted by this effect.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
   a connection unit;
   a case body that is rotatable with respect to the connection unit;
   a display panel on the case body, and comprising a functional layer;
   a joint unit having a plurality of links that connect the connection unit to the case body;
   a detector on a first one of the links; and
   an angle sensor unit mounted on a second one of the links, and configured to sense a location of the detector when the case body rotates.

2. The display apparatus of claim 1, wherein the first one of the links is configured to linearly move with respect to the second one of the links when the case body rotates with respect to the connection unit.

3. The display apparatus of claim 1, wherein the second one of the links defines a first guide hole into which the detector is inserted.

4. The display apparatus of claim 3, wherein the angle sensor unit comprises a plurality of sensors aligned along the first guide hole.

5. The display apparatus of claim 1, wherein the functional layer is configured to be activated in at least one area of the display panel when a location of the detector is measured by the angle sensor unit to be at a location.

6. The display apparatus of claim 1, wherein the display panel comprises:
   a first display area on a first surface of the case body; and
   a second display area extending from the first display area, and located on a lateral surface of the case body and on a second surface of the case body.

7. The display apparatus of claim 6, wherein the functional layer is configured to be activated in the first display area when the first surface of the case body is flat.

8. The display apparatus of claim 6, wherein the functional layer is configured to be activated in the second display area when the first surface of the case body is folded such that folded portions of the first surface contact each other.

9. The display apparatus of claim 6, wherein the functional layer is configured to be activated in the first and second display areas when the first surface of the case body is folded at an angle.

10. The display apparatus of claim 1, wherein the joint unit comprises:
    a first link on a lateral surface of the case body; and
    a second link comprising a first end rotatably coupled to the connection unit, and a second end defining a first guide hole, and being configured to move linearly in a lengthwise direction of the first link.

11. The display apparatus of claim 10, wherein the detector protrudes from the first link, and wherein at least a portion of the detector is inserted into the first guide hole.

12. The display apparatus of claim 1, wherein a first one of the detector and the angle sensor unit defines a concave groove, and
    wherein a second one of the detector and the angle sensor unit comprises a contact protrusion protruding toward the concave groove.

13. A display apparatus comprising:
    a case comprising a first case body, and a second case body rotatably connected to the first case body;
    a display panel comprising:
       a first display area on a first surface of the first case body, and on a first surface of the second case body;
       a second display area on a lateral surface of the second case body, and a on second surface of the second case body; and
       a functional layer that is configured to be activated in at least one area of the display panel according to an angle made by the first case body and the second case body;
    a detector fixedly attached to the case; and
    an angle sensor configured to move with respect to the detector, and configured to sense a location of the detector when the second case body rotates with respect to the first case body to measure the angle.

14. The display apparatus of claim 13, wherein the functional layer is configured to be activated:
    in the first display area when the angle made by the first case body and the second case body is a first angle;
    in the second display area when the angle made by the first case body and the second case body is a second angle; or
    in an entire area of the display panel when the angle made by the first case body and the second case body is between the first angle and the second angle.

15. The display apparatus of claim 14, further comprising:
    a joint unit comprising a plurality of links on a lateral surface of the first case body or a lateral surface of the second case body;
    a detector on a first one of the case and the joint unit; and
    an angle sensor unit on a second one of the case and the joint unit.

16. A method of controlling a display apparatus, the method comprising:
    folding a display panel comprising a first display area on a first surface of a foldable case, and a second display area on a lateral surface of the case and on a second surface of the case;
    measuring an angle formed by the first surface of the display panel by using a detector fixedly attached to the case, and an angle sensor configured to move with respect to the detector, and to sense a location of the detector when the first surface rotates with respect to the second surface to measure the angle; and
    activating a functional layer of at least one area of the display panel based on the angle.

17. The method of claim 16, wherein the measuring of the angle comprises measuring the angle by a relative movement distance between a first link and a second link of a plurality of links on one side of the case.

18. The method of claim 17, wherein the detector is mounted on a first one of the first link and the second link, and the angle sensor is on a second one of the first link and the second link.

19. The method of claim 16, wherein the activating of the functional layer comprises:
    activating the functional layer in the first display area when the angle formed by the first surface of the display panel is a first angle;
    activating the functional layer in the second display area when the angle formed by the first surface of the display panel is a second angle; or
    activating the functional layer in an entire area of the display panel when the angle formed by the first surface of the display panel is between the first angle and the second angle.

* * * * *